(12) United States Patent
Dudde et al.

(10) Patent No.: US 10,131,521 B2
(45) Date of Patent: Nov. 20, 2018

(54) BELT END TERMINATION WITH A CONE CLAMP

(71) Applicants: ThyssenKrupp Elevator AG, Essen (DE); ThyssenKrupp AG, Essen (DE)

(72) Inventors: Frank Dudde, Collierville, TN (US); Peter Feldhusen, Collierville, TN (US)

(73) Assignees: ThyssenKrupp Elevator AG, Essen (DE); ThyssenKrupp AG, Essen (DE)

( * ) Notice: Subject to any disclaimer, the term of this patent is extended or adjusted under 35 U.S.C. 154(b) by 0 days.

(21) Appl. No.: 15/332,228

(22) Filed: Oct. 24, 2016

(65) Prior Publication Data

US 2018/0111795 A1   Apr. 26, 2018

(51) Int. Cl.
| | |
|---|---|
| *B66B 7/08* | (2006.01) |
| *F16G 11/04* | (2006.01) |
| *B66B 9/00* | (2006.01) |

(52) U.S. Cl.
CPC ............... *B66B 7/085* (2013.01); *B66B 9/00* (2013.01); *F16G 11/046* (2013.01)

(58) Field of Classification Search
CPC .......... B66B 7/085; B66B 9/00; F16G 11/046
See application file for complete search history.

(56) References Cited

U.S. PATENT DOCUMENTS

| | | | |
|---|---|---|---|
| 3,136,021 A | 6/1964 | Hoffstrom | |
| 3,333,310 A | 8/1967 | Lagarde et al. | |
| 4,043,690 A * | 8/1977 | Browne | B66B 7/08 29/460 |
| 5,018,251 A * | 5/1991 | Brown | G02B 6/4471 24/122.6 |
| 6,256,841 B1 * | 7/2001 | Ericson | B66B 7/085 24/136 R |
| 6,345,419 B1 * | 2/2002 | Traktovenko | B66B 7/085 24/136 R |
| 6,357,085 B2 | 3/2002 | Ericson et al. | |
| 6,662,408 B2 | 12/2003 | Perez et al. | |
| 6,820,726 B1 * | 11/2004 | Ericson | B66B 7/085 187/411 |
| 7,451,527 B2 * | 11/2008 | Pearce | F16G 11/05 24/122.6 |
| 7,578,035 B2 * | 8/2009 | Dold | B66B 7/062 24/136 R |
| 7,607,204 B2 * | 10/2009 | Ach | B66B 7/085 187/411 |

(Continued)

FOREIGN PATENT DOCUMENTS

| | | |
|---|---|---|
| EP | 1642854 A1 | 4/2002 |
| EP | 2000431 A1 | 12/2008 |

(Continued)

*Primary Examiner* — Michael A Riegelman
(74) *Attorney, Agent, or Firm* — The Webb Law Firm (57) ABSTRACT

An end termination for an elevator system may include an outer clamping member, an inner clamping member having a dimension in a first plane that is greater than a dimension in a second plane, the first plane being spaced from the second plane along a longitudinal axis of the end termination, the inner clamping member coaxially disposed in the outer clamping member, a housing holding the inner clamping member and the outer clamping member therein, and a tightening arrangement to clamp a belt between the inner clamping member and the outer clamping member.

20 Claims, 8 Drawing Sheets

(56) References Cited

U.S. PATENT DOCUMENTS

| | | | |
|---|---|---|---|
| 8,096,024 B2 | 1/2012 | Smith et al. | |
| 9,422,134 B2 | 8/2016 | Ikonen et al. | |
| 2002/0076274 A1* | 6/2002 | Carlsen | F16G 11/048 403/314 |
| 2002/0154944 A1* | 10/2002 | Traktovenko | B66B 7/085 403/347 |
| 2003/0041419 A1* | 3/2003 | Perez | B66B 7/085 24/136 R |
| 2009/0084636 A1* | 4/2009 | Attinger | B66B 7/085 187/412 |
| 2009/0307876 A1* | 12/2009 | Pitts | B66B 7/085 24/136 R |
| 2014/0182975 A1* | 7/2014 | Ikonen | B66B 5/0031 187/251 |
| 2015/0101889 A1* | 4/2015 | Kere | B66B 7/085 187/254 |
| 2015/0151948 A1* | 6/2015 | Pelto-Huikko | B66B 9/00 187/254 |
| 2016/0185572 A1* | 6/2016 | Lehtinen | B66B 7/085 187/411 |
| 2016/0207739 A1* | 7/2016 | Pelto-Huikko | B66B 7/085 |
| 2016/0272466 A1* | 9/2016 | Helenius | B66B 5/0031 |

FOREIGN PATENT DOCUMENTS

| | | |
|---|---|---|
| EP | 3040301 A1 | 7/2016 |
| SU | 1009960 A | 4/1983 |
| WO | 2009109060 A1 | 9/2009 |
| WO | 2010019436 A1 | 2/2010 |
| WO | 2015044511 A1 | 4/2015 |

* cited by examiner

BELT END TERMINATION WITH A CONE CLAMP

BACKGROUND OF THE INVENTION

Field of the Invention

This disclosure relates generally to an end termination for use with an elevator system and, more particularly, to a belt end termination with a cone clamp for use with an elevator system.

Description of Related Art

A conventional elevator system includes a car, at least one counterweight, two or more ropes interconnecting the car and counterweights, end terminations for each end of the ropes at the connection points with the, building, car, and/or counterweights, and a motor arrangement for moving the car and counterweights. The ropes are traditionally formed of laid or twisted steel wire that are easily and reliably terminated by compression end terminations. Currently, however, the industry has moved towards using flat ropes or belts that have small cross-section cords and polymeric jackets. Therefore, there is a current need for an end termination for use in an elevator system using flat ropes or belts that optimizes terminations and load transfers of the flexible flat ropes or belts currently used in the industry.

End terminations are important components in elevator systems since the end terminations transfer the load between the belt ends and structural elements or moving components, such as elevator cars and/or counterweights. A malfunction of an end termination can cause serious damage on an elevator and poses a serious safety risk to passengers. In the event the belt slips or breaks in the end termination, the belt, which is connected to the termination, is loose and cannot transfer the load between the car and the counterweight. Further, the steel cords of the elevator system could be pulled out of the clamp because the adhesive force between the steel cords and a belt envelope is limited. This situation can worsen in the event the termination and the belt are exposed to heat. The polymer belt envelope may show excessive creep at temperatures above 80 degrees Celsius and starts to melt at temperatures around 140 degrees Celsius. The small wrap radius on the wedge of the belt termination can also present further problems within the elevator system. A smaller wedge radius provides a better protection against the belt pulling out of the end termination. The smaller wedge radius, however, leads to a highly unequal clamp force distribution in the end termination and the belt may break under high pulling forces. Therefore, current wedge-type end terminations are not always suitable for composite belts. Further, current end terminations are difficult and expensive to manufacture and assemble, which typically includes welding. Current end terminations are typically bulky and heavy.

SUMMARY OF THE INVENTION

In view of the foregoing, a need exists for an end termination with a load independent clamp force. Another need exists for an end termination with a constant clamp force over a length of the end termination. Another need exists for an end termination with a smooth force distribution between the belt and the clamp without pressure peaks.

In accordance with one aspect, an end termination for an elevator system may include an outer clamping member, an inner clamping member having a dimension in a first plane that is greater than a dimension in a second plane, the first plane being spaced from the second plane along a longitudinal axis of the end termination, the inner clamping member coaxially disposed in the outer clamping member, a housing holding the inner clamping member and the outer clamping member therein, and a tightening arrangement to clamp a belt between the inner clamping member and the outer clamping member.

The inner clamping member and the outer clamping member may have corresponding conical shapes. The inner clamping member may have a tapering shape. The outer clamping member may define an inner cavity that corresponds in shape to the tapering shape of the inner clamping member. The tightening arrangement may extend coaxially through the inner clamping member and the outer clamping member. The tightening arrangement may include a bolt extending through the housing and the inner clamping member, and a nut configured to rotate to tighten the tightening arrangement. An inspection barrel may be provided on an end of the tightening arrangement. The inspection barrel may define at least one inspection opening to permit a user to view at least a portion of the belt clamped between the inner clamping member and the outer clamping member. The housing may define at least one inspection opening to permit a user to view at least a portion of the inner clamping member. An inspection projection may extend from an outer surface of the inner clamping member. At least one disk spring may be provided on the tightening arrangement. The inner clamping member may have an outer surface that tapers from a top end of the inner clamping member to a bottom end of the inner clamping member. The outer clamping member may have an inner surface that tapers from a top end of the outer clamping member to a bottom end of the outer clamping member.

In another disclosure, an elevator system may include at least one elevator car hoisted and lowered using a belt, and at least one end termination operatively connecting the belt to a component of the elevator system, the end termination may include an outer clamping member, an inner clamping member having a dimension in a first plane that is greater than a dimension in a second plane, the first plane being spaced from the second plane along a longitudinal axis of the end termination, the inner clamping member coaxially disposed in the outer clamping member, a housing holding the inner clamping member and the outer clamping member therein, and a tightening arrangement to clamp a belt between the inner clamping member and the outer clamping, member.

The inner clamping member and the outer clamping member may have corresponding conical shapes. The inner clamping member may have a tapering shape. The outer clamping member may define an inner cavity that corresponds in shape to the tapering shape of the inner clamping member. The tightening arrangement may extend coaxially through the inner clamping member and the outer clamping member. The tightening arrangement may include a bolt extending through the housing and the inner clamping member, and a nut configured to rotate to tighten the tightening arrangement. An inspection barrel may be provided on an end of the tightening arrangement. The inspection barrel may define at least one inspection opening to permit a user to view at least a portion of the belt clamped between the inner clamping member and the outer clamping member. The housing may define at least one inspection opening to permit a user to view at least a portion of the inner clamping member. An inspection projection may extend from an outer surface of the inner clamping member. At least one disk spring may be provided on the tightening arrangement. The inner clamping member may have an outer surface that tapers from a top end of the inner clamping member to a bottom end of the inner clamping member. The outer clamping member may have an inner surface that tapers from a top end of the outer clamping member to a bottom end of the outer clamping member.

Further aspects will now be described in the following numbered clauses.

Clause 1: An end termination for an elevator system, comprising: an outer clamping member; an inner clamping member having a dimension in a first plane that is greater than a dimension in a second plane, the first plane being spaced from the second plane along a longitudinal axis of the end termination, the inner clamping member coaxially disposed in the outer clamping member; a housing holding the inner clamping member and the outer clamping member therein; and a tightening arrangement to clamp a belt between the inner clamping member and the outer clamping member.

Clause 2: The end termination as claimed in Clause 1, wherein the inner clamping member and the outer clamping member have corresponding conical shapes.

Clause 3: The end termination as claimed in Clause 1 or Clause 2, wherein the inner clamping member has a tapering shape; and wherein the outer clamping member defines an inner cavity having a corresponding shape to the tapering shape of the inner clamping member.

Clause 4: The end termination as claimed in any of Clauses 1-3, wherein the tightening arrangement extends coaxially through the inner clamping member and the outer clamping member, and wherein the tightening arrangement comprises: a bolt extending through the housing and the inner clamping member; and a nut engaged with the bolt to tighten the tightening arrangement.

Clause 5: The end termination as claimed in any of Clauses 1-4, further comprising an inspection barrel provided on an end of the tightening arrangement, and wherein the inspection barrel defines at least one inspection opening to permit a user to view at least a portion of the belt clamped between the inner clamping member and the outer clamping member.

Clause 6: The end termination as claimed in any of Clauses 1-5, wherein the housing defines at least one inspection opening to permit a user to view at least a portion of the inner clamping member.

Clause 7: The end termination as claimed in any of Clauses 1-6, wherein an inspection projection extends from an outer surface of the inner clamping member.

Clause 8: The end termination as claimed in any of Clauses 1-7, further comprising at least one disk spring provided on the tightening arrangement to generate a normal force needed to tension the inner clamping member and the outer clamping member.

Clause 9: The end termination as claimed in any of Clauses 1-8, wherein the inner clamping member has an outer surface that tapers from a top end of the inner clamping member to a bottom end of the inner clamping member.

Clause 10: The end termination as claimed in Clause 9, wherein the outer clamping member has an inner surface that tapers from a top end of the outer clamping member to a bottom end of the outer clamping member.

Clause 11: An elevator system, comprising: at least one elevator car hoisted and lowered using a belt; and at least one end termination operatively connecting the belt to a component of the elevator system, the end termination comprising: an outer clamping member; an inner clamping member having a dimension in a first plane that is greater than a dimension in a second plane, the first plane being spaced from the second plane along a longitudinal axis of the end termination, the inner clamping member coaxially disposed in the outer clamping member; a housing holding the inner clamping member and the outer clamping member therein; and a tightening arrangement to clamp a belt between the inner clamping member and the outer clamping member.

Clause 12: The end termination as claimed in Clause 11, wherein the inner clamping member and the outer clamping member have corresponding conical shapes.

Clause 13: The end termination as claimed in Clause 11 or Clause 12, wherein the inner clamping member has a tapering shape; and wherein the outer clamping member defines an inner cavity having a corresponding shape to the tapering shape of the inner clamping member.

Clause 14: The end termination as claimed in any of Clauses 11-13, wherein the tightening arrangement extends coaxially through the inner clamping member and the outer clamping member, and wherein the tightening arrangement comprises: a bolt extending through the housing and the inner clamping member; and a nut engaged with the bolt to tighten the tightening arrangement.

Clause 15: The end termination as claimed in any of Clauses 11-14, further comprising an inspection barrel provided on an end of the tightening arrangement, and wherein the inspection barrel defines at least one inspection opening to permit a user to view at least a portion of the belt clamped between the inner clamping member and the outer clamping member.

Clause 16: The end termination as claimed in any of Clauses 11-15, wherein the housing defines at least one inspection opening to permit a user to view at least a portion of the inner clamping member.

Clause 17: The end termination as claimed in any of Clauses 11-16, wherein an inspection projection extends from an outer surface of the inner clamping member.

Clause 18: The end termination as claimed in any of Clauses 11-17, further comprising at least one disk spring provided on the tightening arrangement to generate a normal force needed to tension the inner clamping member and the outer clamping member.

Clause 19: The end termination as claimed in any of Clauses 11-18, wherein the inner clamping member has an outer surface that tapers from a top end of the inner clamping member to a bottom end of the inner clamping member.

Clause 20: The end termination as claimed in Clause 19, wherein the outer clamping member has an inner surface that tapers from a top end of the outer clamping member to a bottom end of the outer clamping member.

Further details and advantages will be understood from the following detailed description read in conjunction with the accompanying drawings.

DESCRIPTION OF THE DISCLOSURE

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, an end termination for an elevator system and, in particular, to an end termination with a cone clamp for use in an elevator system. Certain preferred and non-limiting aspects of the components of the end termination are illustrated in FIGS. 1-11.

Figure 1:
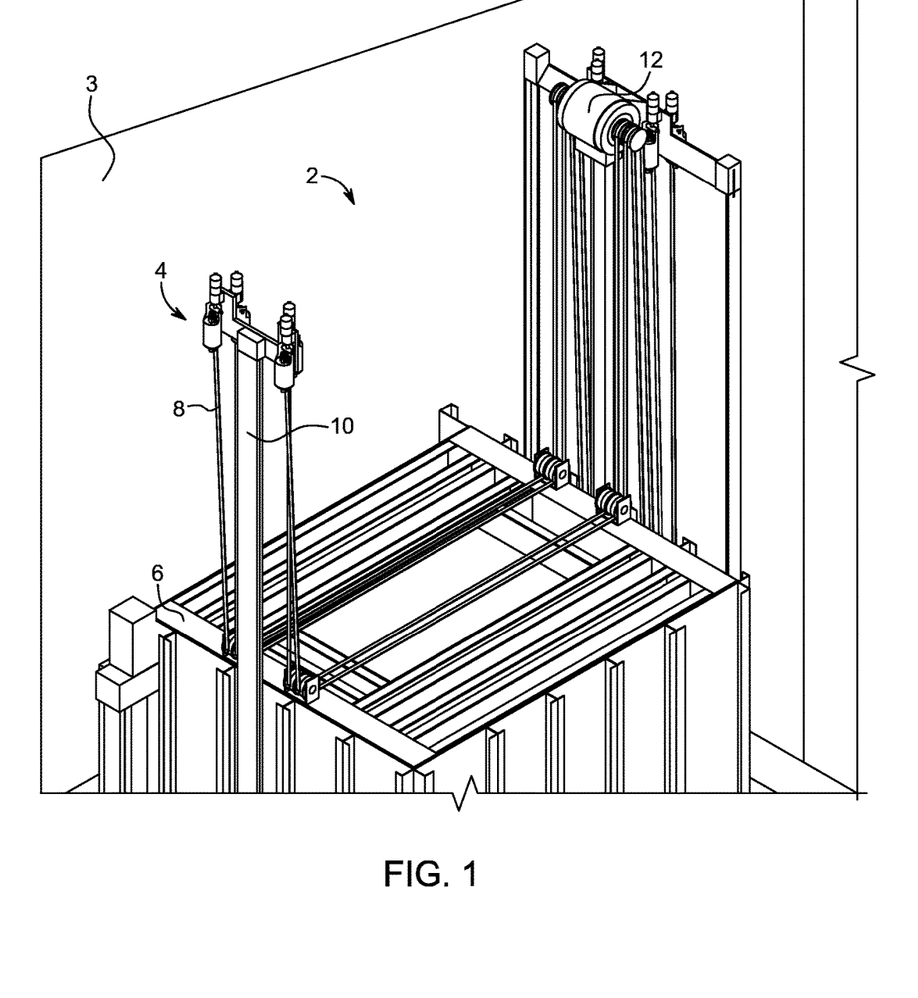
FIG. 1 is a perspective view of an elevator system including at least one end termination according an aspect of the present disclosure.

With reference to FIG. 1, an elevator system 2 utilizing at least one end termination 4 is shown. The elevator system 2 may include an elevator car 6 movable within an elevator shaft 3 using a plurality of belts 8 that hoist and/or lower the elevator car 6. In one aspect, the elevator system 2 includes four belts 8 configured to move the elevator car 6 within the elevator shaft 3. Each end of each belt 8 may be held in a separate end termination 4. The end terminations 4 may mounted to one or more of a car guide rail 10, a counterweight guide rail, a motor frame, a ceiling or a wall of the elevator shaft 3, the elevator car 6, or a counterweight. In one aspect, the elevator system 2 utilizes eight separate end terminations 4 to control the load transfer between the elevator car 6 and the counterweight. A motor arrangement 12 may be configured to drive the belts 8 to lift and lower the elevator car 6.

With additional reference to FIGS. 2-9, the end termination 4 is shown and described. In one aspect, the end termination 4 may be used with a composite belt 8 used to hoist and/or lower the elevator car 6 and/or counterweight in the elevator shaft 3. In one aspect, a composite belt 8 may include an outer polymer envelope and at least one arrangement of load carrying cords or strands provided within the envelope. In one aspect, the load carrying cords may be made of steel. In one aspect, the end termination 4 may be configured for use with belts 8 having a width between 30 and 100 mm. It is to be understood, however, that the end termination 4 could be adapted to operate with belts having a smaller or larger width. Operation and use of the end termination 4 is described in greater detail below.

The end termination 4 may include a housing 14 that is substantially cylindrical and configured to house the inner components of the end termination 4, as described in detail below. The housing 14 may define a recess 16 in a bottom portion thereof. At least two apertures 18a, 18b may be defined in the bottom portion of the housing 14. The apertures 18a, 18b may be configured to receive an eye rod bolt 20. The eye rod bolt 20 may extend through and between the two apertures 18a, 18b. A portion of each end of the eye rod bolt 20 may extend from the recess 16, through a corresponding aperture 18a, 18b, and external to the housing 14. A securing member 22a, 22b may be removably inserted into each end of the eye rod bolt 20 external to the housing 14 to prevent the eye rod bolt 20 from moving within the recess 16. In one aspect, the securing members 22a, 22b may be splints inserted through an aperture defined in each end of the eye rod bolt 20. It is to be understood, however, that any type of mechanical securing member may be used to secure the eye rod bolt 20 in the housing 14, such as a bolt, screw, or lock. It is also contemplated that the securing members 22a, 22b may be permanently provided on the eye rod bolt 20 through welding or any similar type of permanent fastening method. In one aspect, the eye rod bolt 20 may be received within an eye rod 24 that is secured to or part of the elevator car 6 or elevator system 2. An upper portion of the eye rod 24 may be positioned within the recess 16 of the housing, and a lower portion (substantially perpendicular to the upper portion) may extend from the upper portion to the support beam or structure 10 of the elevator car 6 or elevator system 2.

Figure 2:
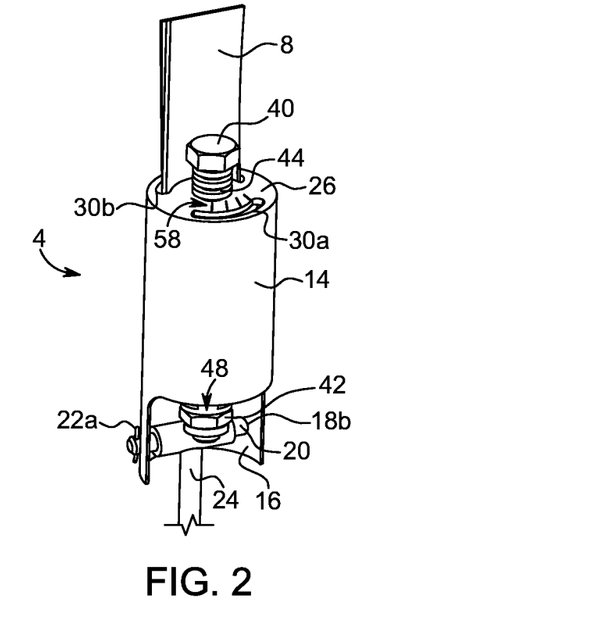
FIG. 2 is a front perspective view of the end termination used in the elevator system of FIG. 1.
Figure 3:
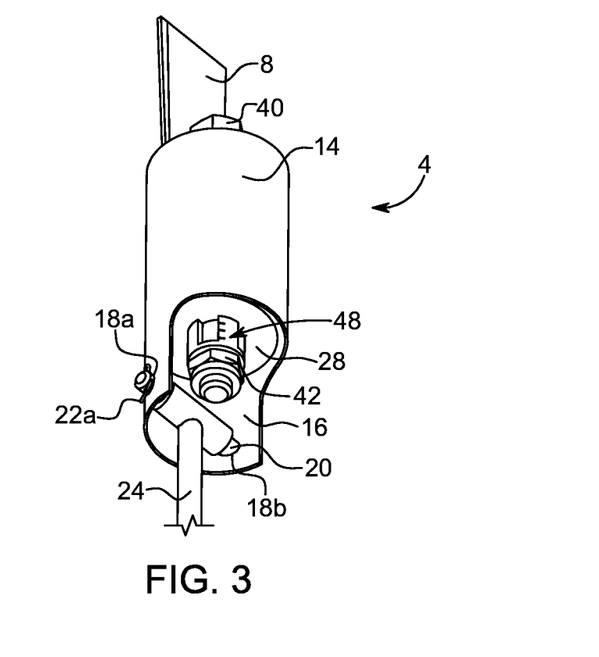
FIG. 3 is a bottom perspective view of the end termination of FIG. 2.

With reference to FIGS. 2 and 3, the housing 14 may also include a top side 26. In one aspect, the top side 26 of the housing 14 may define at least one inspection opening 30a, 30b. In another aspect, the top side 26 of the housing 14 may define two inspection openings 30a, 30b. Each inspection opening 30a, 30b may have a generally arcuate shape that extends around a circumferential surface of the top side 26. In one aspect, the inspection openings 30a, 30b are defined opposite one another in the top side 26 so that one inspection opening 30a, 30b extends around a first portion of the top side 26 and the other inspection opening 30a, 30b extends around an opposing second portion of the top side 26. In one aspect, the inspection openings 30a, 30b are configured to permit a user to inspect and view the inner components of the end termination 4, as will be described in greater detail below. The belt 8 may extend into the housing 14 of the end termination 4 via one of the inspection openings 30a, 30b.

Figure 5:
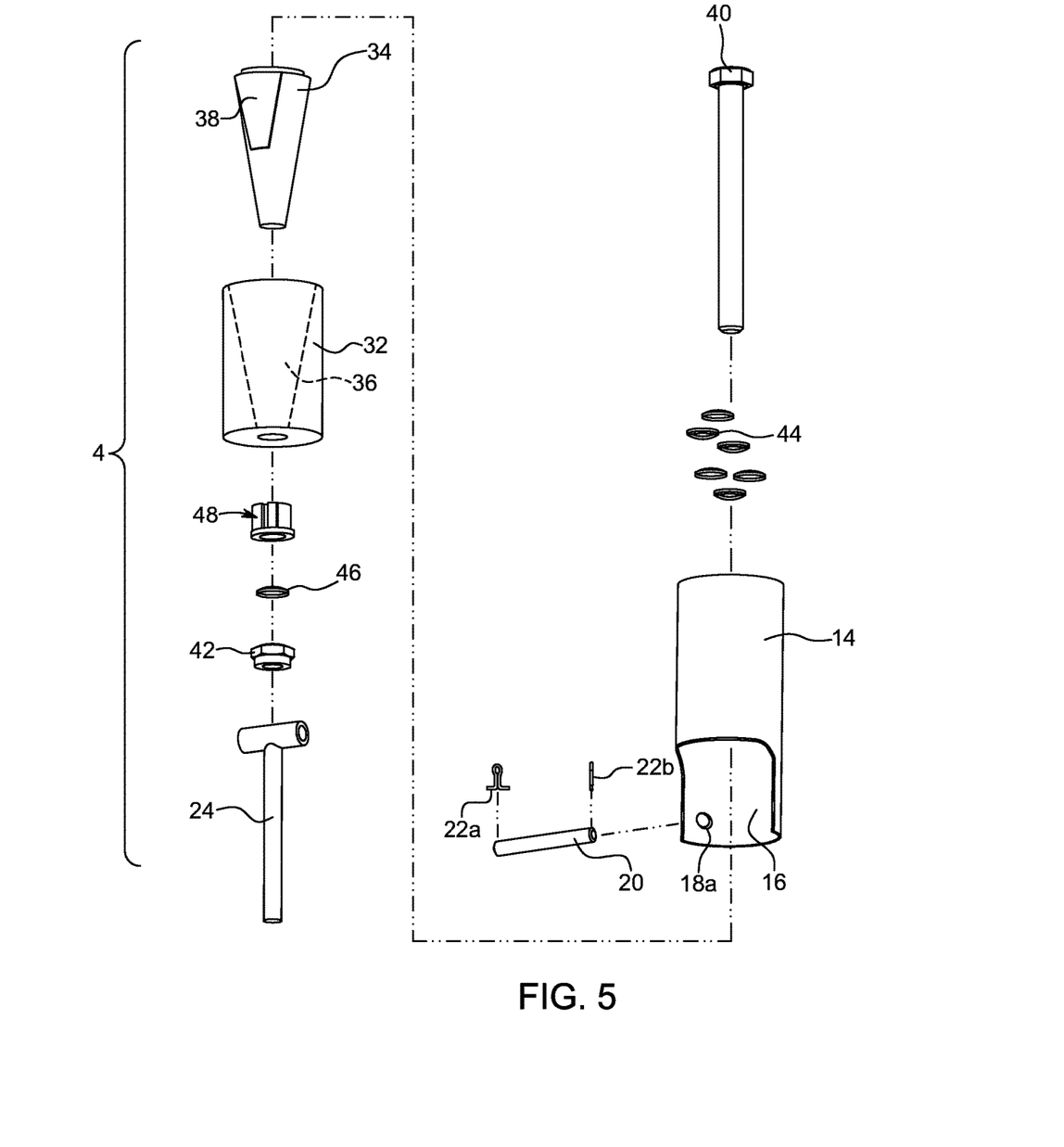
FIG. 5 is an exploded perspective view of the end termination of FIG. 2.
Figure 6:
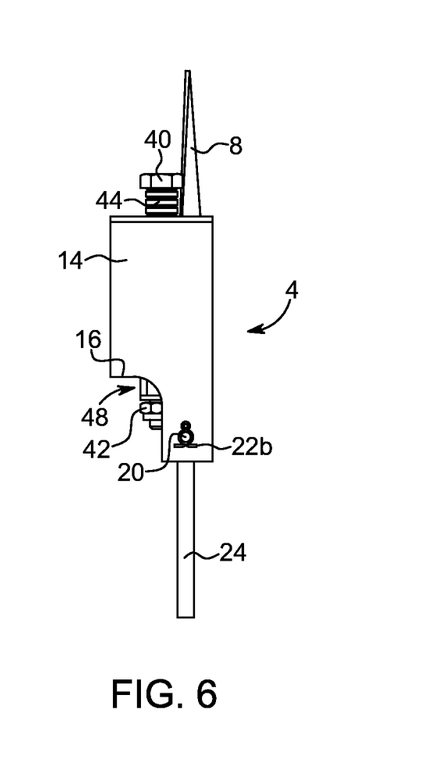
FIG. 6 is a side view of the end termination of FIG. 2.
Figure 7:
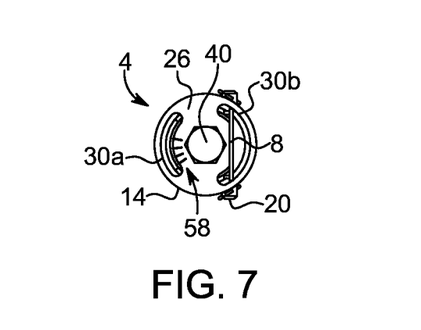
FIG. 7 is a top view of the end termination of FIG. 2.
Figure 8:
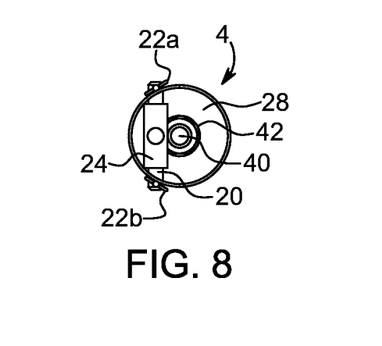
FIG. 8 is a bottom view of the end termination of FIG. 2.
Figure 9:
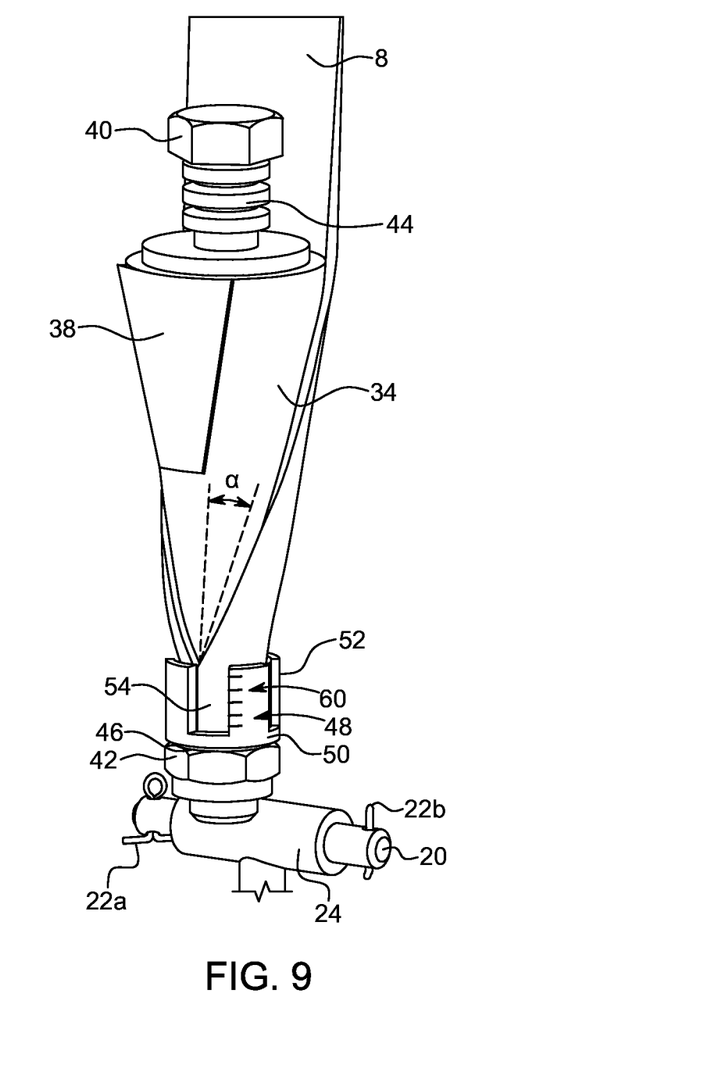
FIG. 9 is a perspective view of the end termination of FIG. 2 with a housing removed.
Figure 10:
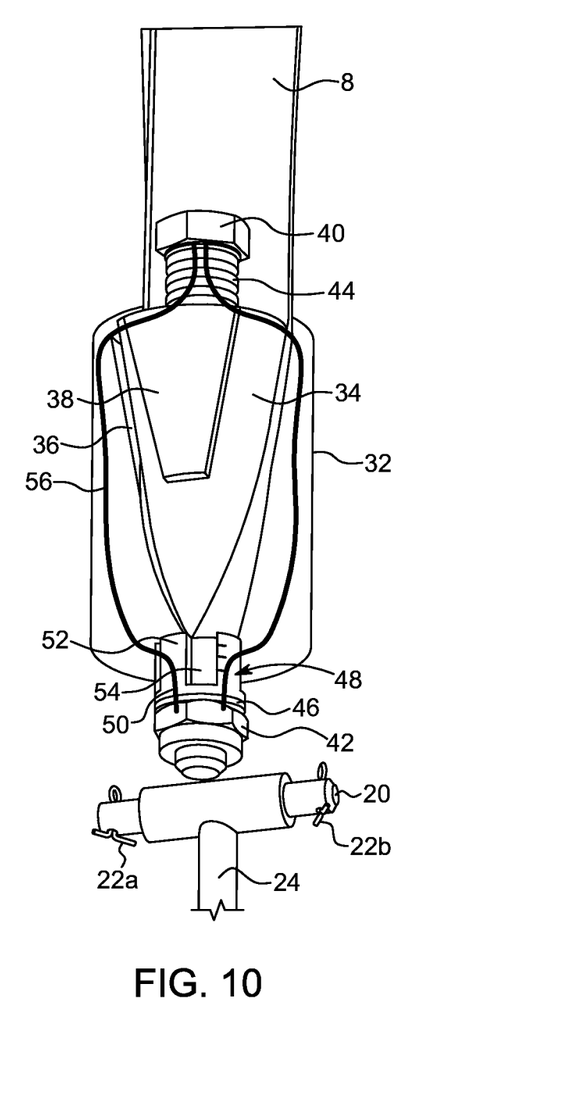
FIG. 10 is another perspective view of the end termination of FIG. 2 showing a force flow through the end termination.

With specific reference to FIGS. 5, 9, and 10, the inner components of the end termination 4 are described. In one aspect, the end termination 4 may include a clamping arrangement including an outer cone member 32 (also referred to as an outer clamping member) and an inner cone member 34 (also referred to as an inner clamping member). The inner cone member 34 may be received within the outer cone member 32. In one aspect, the outer cone member 32 and the inner cone member 34 are arranged in the housing 14 to clamp the belt 8 between the outer cone member 32 and the inner cone member 34. As shown in FIG. 5, the outer cone member 32 may define an inner cavity 36. The inner cavity 36 may have a greater diameter at a top end that inclines to a smaller diameter at a bottom end thereof. In one aspect, the inner cavity 36 may have a substantially conical shape. In one aspect, the inner cone member 34 may have a substantially conical outer surface in which a top end of the inner cone member 34 has a greater diameter than a bottom end of the inner cone member 34. In another aspect, a dimension in a first plane of the inner cone member 34 is greater than a dimension in a second plane of the inner cone member 34. In another aspect, a cross-sectional diameter in a first plane of the inner cone member 34 is greater than a cross-sectional diameter in a second plane of the inner cone member 34. In one aspect, the cross-sectional shape of the inner cone member 34 may be circular, elliptical, oval, or any other similar shape. The angle of inclination α of the outer surface of the inner cone member 34 may be between 5 and 15 degrees. In another aspect, the angle of inclination α may be 9.2 degrees, or approximately 9.2 degrees. It is to be understood, however, that any range of degrees may be utilized for the angle of inclination α of the inner cone member 34 to apply different clamping forces on the belt 8. The outer surface of the inner cone member 34 may have a gradual, constant taper from a top end of the inner cone member 34 to a bottom end of the inner cone member 34. In one aspect, the inner cavity 36 of the outer cone member 32 may have a corresponding angle of inclination to the angle of inclination α of the inner cone member 34. As shown in FIG. 9, an inspection projection 38 may extend from an outer surface of the inner cone member 34. The inspection projection 38 may extend from an upper portion of the side surface of the inner cone member 34 and may have an inclined shape. In one aspect, a top end of the inspection projection 38 may have a greater diameter than a bottom end of the inspection projection 38. When the end termination 4 is fully assembled, the inspection projection 38 may be viewed through the inspection opening 30a defined in the top side 26 of the housing 14. The inspection projection 38 allows the user to confirm that the inner cone member 34 is in correct alignment (and not jammed) inside the outer cone member 32. A belt wrapping angle on the upper part of the inner cone member 34 is significantly less than 360 degrees. The inner cone member 34 tends to tilt over to the side which is not wrapped by the belt 8 when it is inserted into the outer cone member 32. The user can ensure the belt 8 does not cover the inspection projection 38 during assembly. The user can then confirm proper alignment between the inner cone member 34 and the outer cone member 32 by making sure the inspection projection 38 is visible from the inspection opening 30a in the housing 14. In one aspect, the outer surface of the inner cone member 34 and the inner surface of the outer cone member 32 may be knurled to create additional friction with the belt 8 to increase the clamping force on the belt 8. It is also contemplated that alternative surface treatments may be used on the outer cone member 32 and the inner cone member 34 to increase the friction created between the belt 8 and the outer cone member 32 and the inner cone member 34.

With specific reference to FIGS. 2, 3, 5, and 9, in one aspect, the outer cone member 32 and the inner cone member 34 may be held within the housing 14 with a tightening arrangement that extends through a cavity defined in the inner cone member 34. In one aspect, the tightening arrangement may be a bolt 40 and nut 42 assembly. The bolt 40 may extend through the top side 26 of the housing 14, the inner cone member 34, and the bottom side 28 of the outer cone member 28 to secure the inner cone member 34 and the outer cone member 32 within the housing 14. The nut 42 may be fastened on a bottom end of the bolt 40 external of the housing 14. The nut 42 may be rotated to tighten the inner components of the end termination 4. In one aspect, as the nut 42 is rotated, the outer cone member 32 and the inner cone member 34 are tightened together to clamp the belt 8 therebetween. The nut 42 can be rotated to a predetermined position to achieve a desired clamping force on the belt 8. At least one disk spring 44 may be provided on a top end of the bolt 40 to provide a cushion between the head of the bolt 40 and the top side 26 of the housing. In one aspect, six disk springs 44 may be provided on a top end of the bolt 40. In one aspect, the disk springs 44 may be pre-tensioned and configured to elastically deform under pressure upon tightening of the nut 42 on the bolt 40. In a similar manner, at least one disk spring 46 may be provided on a lower end of the bolt 40 between the nut 42 and an inspection barrel 48, which is described in greater detail below. In one aspect, the disk spring 46 may be pre-tensioned and configured to elastically deform under pressure upon tightening of the nut 42 on the bolt 40. The arrangement of disk springs 44, 46 generates a normal force to tension the outer cone member 32 and the inner cone member 34 to provide a belt clamp force. In one aspect, more than one disk spring 44, 46 is needed to reach a desired spring constant. The disk springs 44, 46 may be arranged parallel and/or in series. If, for example, the spring constant is too large, initial settlement processes may significantly lower the clamp force, which is not intended. The clamping force loss during initial settlement should be less than or equal to 20% to limit clamping force changes.

With specific reference to FIGS. 2 and 9, the inspection barrel 48 of the end termination 4 is described. The inspection barrel 48 may be positioned on a lower end of the bolt 40. When the end termination 4 is fully assembled, the inspection barrel 48 may be positioned between the disk spring 46 and the bottom side 28 of the outer cone member 32. The inspection barrel 48 may be positioned within the recess 16 defined by the housing 14. The inspection barrel 48 may include a base member 50 and a main body 52 that defines at least one inspection opening 54. The base member 50 may rest on the disk spring 46. A top end of the main body 52 may abut the bottom side 28 of the outer cone member 32. The inspection barrel 48 may have a generally cylindrical shape configured to receive an end of the belt 8 held in the end termination 4. In one aspect, the inspection barrel 48 may define three inspection openings 54.

Figure 4:
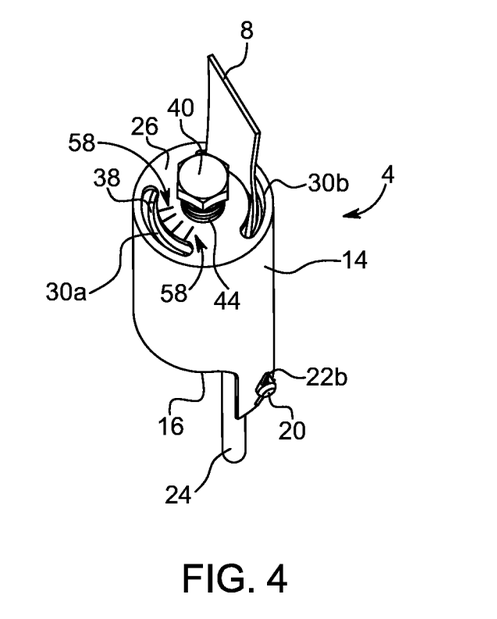
FIG. 4 is a top perspective view of the end termination of FIG. 2.

With specific reference to FIGS. 4 and 9, operation and use of the end termination 4 is described. Many of the components of the end termination 4 do not require extensive assembly or welding, which assists in reducing the manufacturing costs of the end termination 4. During assembly of the end termination 4, the belt 8 is positioned between the outer cone member 32 and the inner cone member 34 such that the belt 8 is wrapped around the outer surface of the inner cone member 32. The belt 8 may be wrapped around the inner cone member 34 with corners of the end of the belt 8 wrapped together such that the corners contact one another and are held in the inspection barrel 48. The end of the belt 8 may be held in the inspection barrel 48 so that the belt 8 is visible via an inspection opening 54 defined in the inspection barrel 48. After the belt 8 has been wrapped around the inner cone member 34, the outer cone member 32 may be slid on the inner cone member 34 to clamp the belt 8 therebetween. The housing 14 may then be positioned around the outer cone member 32. The belt 8 may extend through an inspection opening 30b defined in the top side 26 of the housing 14. The eye rod 24 may be connected to the support beam or structure 10 on the elevator car 6 or counterweight. After the belt 8 has been positioned in the inspection barrel 48 and between the outer cone member 32 and the inner cone member 34 within the housing 14, the nut 42 may be rotated to tighten together the inner components of the end termination 4 to clamp the belt 8 between the outer cone member 32 and the inner cone member 34. As shown in FIG. 10, as the nut 42 is rotated, a force flow 56 is achieved within the end termination 4 to clamp the belt 8 therein. Each part of the end termination 4 braced with the bolt 40, such as the inner and outer cone members 32, 34 as well as the belt 8, are included in the internal clamping force flow. The braced parts would move with the belt 8 without the housing 14. The housing 14 provides the counterforce to the belt pulling force, because the housing 14 is connected with the eye rod 24 to the car, counterweight, or building. The top portion of the inner cone member 34 is supported by the top portion of the housing 14. The clamping force is provided to the end termination 4 via the pre-tensioned disk springs 44, which is independent from a belt pulling force. This arrangement provides an advantage over current end terminations that rely on a belt pulling force to hold a belt within the end termination. The belt pulling forces may be variable and erratic, which may result in excessive belt slippage in current end terminations.

After the nut 42 has been rotated to a desired position, a user may inspect the position of the belt 8 within the end termination 4 via the inspection opening 30a in the top side of the housing 14 and/or the inspection opening 54 of the inspection barrel 48. In one aspect shown in FIG. 4, the inspection projection 38 of the inner cone member 34 may be positioned in a front end of the housing 14 such that the inspection projection 38 is visible through the inspection opening 30a. In this manner, a user can ensure that the inner cone member 34 is positioned in the correct arrangement within the housing 4. The user may also view portions of the belt 8 through the inspection opening 30a to ensure that the belt 8 is properly wrapped around the inner cone member 34 and clamped between the outer cone member 32 and the inner cone member 34. In one aspect and shown in FIG. 4, an identifier 58 may be provided on the top side 26 of the housing 14 to identify the proper position in which the belt 8 should be positioned in the end termination 4. The identifier 58 may be a measurement scale, a color scale, or an electronic sensor that can detect slip of the belt 8 within the end termination 4. The measurement scale and color scale can be used to indicate to a user the amount of slip that has occurred since initial assembly of the end termination 4. Based upon the amount of slip of the belt 8 indicated by the identifier 58, the user can reposition the belt 8 within the end termination 4 to avoid any further slippage that could lead to the belt 8 pulling loose from the end termination 4. The user may also view the belt 8 through an inspection opening 54 of the inspection barrel 48. After the corners of the ends of the belt 8 have been brought together and held in the inspection barrel 48, the end of the belt 8 may be visible through the inspection opening 54 to allow the user to ensure the belt 8 has been properly held in the end termination 4. During operation of the elevator system 2, the belt 8 may slip within the end termination 4 such that the belt 8 may begin to pull out of the end termination 4. Using the inspection opening 54 of the inspection barrel 48, the user can quickly identify any belt slip within the end termination 4 before the belt 8 slips out of the end termination 4. In the event the user identifies belt slip within the end termination 4, the user may re-position the belt 8 within the end termination 4 to bring the belt 8 back into its intended position. In one aspect and shown in FIG. 9, an identifier 60 may be provided on the main body 52 of the inspection barrel 48 to identify the proper position in which the belt 8 should be positioned in the inspection barrel 48. The identifier 60 may be a measurement scale, a color scale, or an electronic sensor that can detect slip of the belt 8 within the end termination 4. The measurement scale and color scale can be used to indicate to a user the amount of slip that has occurred since initial assembly of the end termination 4. Based upon the amount of slip of the belt 8 indicated by the identifier 60, the user can reposition the belt 8 within the end termination 4.

Figure 11:
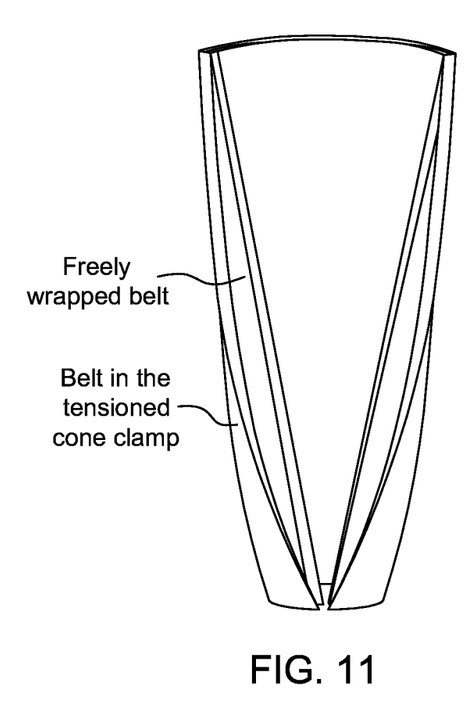
FIG. 11 is a front view showing differences between a freely wrapped belt and a belt clamped in the end termination of FIG. 2.

With specific reference to FIG. 11, since the envelope of the belt 8 is made of a polymer, a settling process of the belt 8 takes place within the end termination 4 after the initial tightening of the bolt 40 and nut 42. When the belt 8 is freely wrapped along an axis in a longitudinal belt direction without tightening of the bolt 40 and nut 42, the geometric shape of the belt 8 may more closely resembles a vortex than a cone. Upon tightening of the bolt 40 and the nut 42, a limited amount of irreversible plastic deformation takes place in the belt envelope during the transition from a vortex shape into a cone shape that corresponds to the shape of the inner cone member 34. After the belt 8 has formed into a cone shape under the constant pressure within the end termination 4, the thermoplastic polymer materials of the belt envelope will experience creep over time until the cords or strands of the belt 8 contact the inner surface of the outer cone member 32 and the outer surface of the inner cone member 34. By clamping the cords or strands of the belt 8 between the outer cone member 32 and the inner cone member 34, a greater clamping force is achieved for the end termination 4, which may assist in reducing slip within the end termination 4. The increased friction experienced between the cords or strands and the outer cone member 32 and the inner cone member 34 increases the clamping force for the end termination 4.

While several aspects of the end termination are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. An end termination for an elevator system, comprising:
 an outer clamping-member, at least a portion of the outer clamping member having a circular cross section that is perpendicular to a longitudinal axis of the end termination;
 an inner clamping member having a dimension in a first plane that is greater than a dimension in a second plane, the first plane being spaced from the second plane along the longitudinal axis of the end termination, the inner clamping member coaxially disposed in the outer clamping member, and at least a portion of the inner clamping member has a circular cross section that is perpendicular to the longitudinal axis of the end termination;
 a housing holding the inner clamping member and the outer clamping member therein; and
 a tightening arrangement to clamp a belt between the inner clamping member and the outer clamping member.

2. The end termination as claimed in claim 1,
 wherein the inner clamping member has a tapering shape; and
 wherein the outer clamping member defines an inner cavity having a corresponding shape to the tapering shape of the inner clamping member.

3. The end termination as claimed in claim 1,
 wherein the tightening arrangement extends coaxially through the inner clamping member and the outer clamping member, and
 wherein the tightening arrangement comprises:

a bolt extending through the housing and the inner clamping member; and a nut engaged with the bolt to tighten the tightening arrangement.

4. The end termination as claimed in claim 1, further comprising an inspection barrel provided on an end of the tightening arrangement, and wherein the inspection barrel defines at least one inspection opening to permit a user to view at least a portion of the belt clamped between the inner clamping member and the outer clamping member.

5. The end termination as claimed in claim 1, wherein the housing defines at least one inspection opening to permit a user to view at least a portion of the inner clamping member.

6. The end termination as claimed in claim 1, wherein an inspection projection extends from an outer surface of the inner clamping member.

7. The end termination as claimed in claim 1, further comprising at least one disk spring provided on the tightening arrangement to generate a normal force to tension the inner clamping member and the outer clamping member.

8. The end termination as claimed in claim 1, wherein the inner clamping member has an outer surface that tapers from a top end of the inner clamping member to a bottom end of the inner clamping member.

9. The end termination as claimed in claim 8, wherein the outer clamping member has an inner surface that tapers from a top end of the outer clamping member to a bottom end of the outer clamping member.

10. An elevator system, comprising:
at least one elevator car hoisted and lowered using a belt; and
at least one end termination operatively connecting the belt to a component of the elevator system, the end termination comprising:
an outer clamping member, at least a portion of the outer clamping member having a circular cross section that is perpendicular to a longitudinal axis of the end termination;
an inner clamping member having a dimension in a first plane that is greater than a dimension in a second plane, the first plane being spaced from the second plane along the longitudinal axis of the end termination, the inner clamping member coaxially disposed in the outer clamping member, and at least a portion of the inner clamping member has a circular cross section that is perpendicular to the longitudinal axis of the end termination;
a housing holding the inner clamping member and the outer clamping member therein; and
a tightening arrangement to clamp the belt between the inner clamping member and the outer clamping member.

11. The elevator system as claimed in claim 10,
wherein the inner clamping member has a tapering shape; and
wherein the outer clamping member defines an inner cavity having a corresponding shape to the tapering shape of the inner clamping member.

12. The elevator system as claimed in claim 10,
wherein the tightening arrangement extends coaxially through the inner clamping member and the outer clamping member, and
wherein the tightening arrangement comprises:
a bolt extending through the housing and the inner clamping member; and a nut engaged with the bolt to tighten the tightening arrangement.

13. The elevator system as claimed in claim 10, further comprising an inspection barrel provided on an end of the tightening arrangement, and wherein the inspection barrel defines at least one inspection opening to permit a user to view at least a portion of the belt clamped between the inner clamping member and the outer clamping member.

14. The elevator system as claimed in claim 10, wherein the housing defines at least one inspection opening to permit a user to view at least a portion of the inner clamping member.

15. The elevator system as claimed in claim 10, wherein an inspection projection extends from an outer surface of the inner clamping member.

16. The elevator system as claimed in claim 10, further comprising at least one disk spring provided on the tightening arrangement to generate a normal force to tension the inner clamping member and the outer clamping member.

17. The elevator system as claimed in claim 10, wherein the inner clamping member has an outer surface that tapers from a top end of the inner clamping member to a bottom end of the inner clamping member.

18. The elevator system as claimed in claim 17, wherein the outer clamping member has an inner surface that tapers from a top end of the outer clamping member to a bottom end of the outer clamping member.

19. An end termination for an elevator system, comprising:
an outer clamping member, at least a portion of the outer clamping member having a circular cross section that is perpendicular to a longitudinal axis of the end termination;
an inner clamping member having a dimension in a first plane that is greater than a dimension in a second plane, the first plane being spaced from the second plane along the longitudinal axis of the end termination, the inner clamping member coaxially disposed in the outer clamping member;
a housing holding the inner clamping member and the outer clamping member therein; and
a tightening arrangement to clamp a belt between the inner clamping member and the outer clamping member,
wherein the inner clamping member and the outer clamping member have corresponding conical shapes.

20. An elevator system, comprising:
at least one elevator car hoisted and lowered using a belt; and
at least one end termination operatively connecting the belt to a component of the elevator system, the end termination comprising:
an outer clamping member, at least a portion of the outer clamping member having a circular cross section that is perpendicular to a longitudinal axis of the end termination;
an inner clamping member having a dimension in a first plane that is greater than a dimension in a second plane, the first plane being spaced from the second plane along the longitudinal axis of the end termination, the inner clamping member coaxially disposed in the outer clamping member;
a housing holding the inner clamping member and the outer clamping member therein; and a tightening arrangement to clamp the belt between the inner clamping member and the outer clamping member,
wherein the inner clamping member and the outer clamping member have corresponding conical shapes.

* * * * *